(12) United States Patent
Ball, IV et al.

(10) Patent No.: US 9,943,783 B2
(45) Date of Patent: **\*Apr. 17, 2018**

(54) DE-SANDING TANK WITH CONICAL BOTTOM

(71) Applicant: KBK Industries, LLC, Rush Center, KS (US)

(72) Inventors: Will Dexter Ball, IV, Bixby, OK (US); Brian Baalmann, Lacross, KS (US)

(73) Assignee: KBK INDUSTRIES, LLC, Rush Center, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/586,959

(22) Filed: May 4, 2017

(65) Prior Publication Data

US 2017/0232366 A1    Aug. 17, 2017

Related U.S. Application Data

(63) Continuation of application No. 15/546,156, filed on Nov. 18, 2014, now Pat. No. 9,656,276.

(51) Int. Cl.
| | |
|---|---|
| *B04C 5/181* | (2006.01) |
| *B01D 21/24* | (2006.01) |
| *B01D 21/26* | (2006.01) |

(52) U.S. Cl.
CPC .......... *B01D 21/267* (2013.01); *B01D 21/24* (2013.01); *B04C 5/181* (2013.01)

(58) Field of Classification Search
CPC ........ B04C 5/181; B01D 21/24; B01D 21/267
See application file for complete search history.

(56) References Cited

U.S. PATENT DOCUMENTS 9,199,251 B1    12/2015  Ball, IV
9,656,276 B1 *   5/2017  Ball, IV ............. B01D 21/0003

\* cited by examiner

*Primary Examiner* — David A Reifsnyder
(74) *Attorney, Agent, or Firm* — Leydig, Voit & Mayer, Ltd.

(57) ABSTRACT

A de-sanding tank with a conical bottom. The de-sanding tank includes an enclosed tank having a vertical wall that extends down to a flat bottom. A conical bottom is disposed within an interior of the tank. The conical bottom is secured to the vertical wall forming an enclosing space bounded by a wall of the conical bottom and the vertical wall and flat bottom of the tank. A solids outlet is disposed at a lower tip of the conical bottom configured for removal of solids. The conical bottom is supported by a foam structure located within the enclosing space.

9 Claims, 3 Drawing Sheets

DE-SANDING TANK WITH CONICAL BOTTOM

CROSS-REFERENCE TO PRIOR APPLICATIONS

This application is a continuation of U.S. patent application Ser. No. 14/546,156, filed Nov. 18, 2014, now U.S. Pat. No. 9,656,727, which issued on May 23, 2017.

FIELD

The present invention is a tank for removing sand and other particulate matter or solids from a water stream. The tank is provided with a conical bottom to aid in the frequent removal of separated solids from the tank.

DESCRIPTION OF THE RELATED ART

Various tank designs have been developed for removing solids from a water stream, such as atmospheric vertical oilfield tanks designed for treating oilfield fluid streams entering a production or processing facility.

One particularly effective solids removal tank is taught U.S. patent application Ser. No. 14/090,477 which was filed on Nov. 26, 2013 for Desanding, Flow Splitting, Degassing Vessel. That patent application teaches a tank for removing sand and other particulate matter or solids from a water stream. In addition to removing solids from the water stream, that tank is designed to remove associated gases and eliminate their inherent mixing energies from the inlet fluid stream, and to divide the outgoing water flow hydraulically and evenly into two or more effluent streams.

That tank works well in separating the solids from the water, but it does have one flaw. The flaw is that the solids that are removed from the water stream tend to accumulate in the flat bottom of the tank and are not easily removed from the flat tank bottom. Because the solids cannot be easily removed, eventually the solids will fill the tank and the tank will have to be removed from service so that the solids can be removed manually.

The present invention addresses this problem by providing a traditional straight sided tank having a vertical exterior wall such as the one taught in U.S. patent application Ser. No. 14/090,477 that is modified to provide the tank with an interior conical bottom.

Solids that accumulate in the conical bottom of this tank can be more effectively removed on a daily basis, extending the time in which the tank may be operated without taking it out of service for maintenance. A solids outlet communicating with the interior of the tank is provided at a lower tip of the conical bottom and is designed as an outlet for removal of the accumulated solids. The tank is also provided with water jet nozzles that are located in the vertical wall of the tank just above the conical bottom. These water jet nozzles are used in removing solids from the tank. The water jet nozzles are angled downwardly and tangentially toward the lower tip of the conical bottom so that when water enters the tank through the water jet nozzles, the water causes a swirling action in the conical bottom that more effectively removes the solids via the solids outlet.

The conical bottom of the tank is enclosed externally with an enclosing space bounded by a flat bottom of the tank and the vertical exterior wall of the tank that surround the interior conical bottom located within the tank.

Because of the large amount of weight exerted by the water contained within the tank and the solids that accumulate within the conical bottom, the conical bottom must be well supported in order to hold all this weight. Traditional methods of providing the needed support to the conical bottom would add weight to the tank and would make it more difficult and expensive to transport and install the assembled tank at the installation site.

The present invention addresses the problems associated with constructing a conical bottom tank by providing a honey combed structure of closed pore foam within the enclosing space surrounding the conical bottom as reinforcement for the conical bottom. The closed pore foam is honey combed with several voids or compartments that fill with water as the tank is placed in service. Thus, part of the support for the conical bottom comes from the water that enters the compartments as the tank is placed into service. The foam structure provides sufficient support for the conical bottom of the tank to support it during transportation to the installation site and during installation. However, the foam structure does not provide sufficient support for the conical bottom to hold the added weight of water and solids in the tank when the tank is full.

These compartments receive water from within the tank via several downwardly facing bottom openings that extend through the wall of the conical bottom. The bottom openings are downwardly facing to prevent excessive solids from entering them as the tank is filled with water.

The bottom openings communicate between the interior of the conical bottom and a common void compartment located at the bottom of the enclosing space. Each of the compartments is in communication with the common void compartment. When the tank is placed in service, water will begin to fill the interior of the tank. As the tank fills with water, water passes through the bottom openings into the common void compartment and then into each of the compartments, filling all of the compartments with water. Air contained within each compartment is expelled into the tank as the compartment fills with water via a plurality of weep holes that communicate between the top of each compartment and the interior of the tank.

Although it would theoretically be possible to fill the entire enclosing space with closed pore foam such that the honey combing structure of the present invention would not be necessary, because of the high cost of this material, it would make the tank much more expensive.

SUMMARY OF THE INVENTION

The present invention is a traditional straight sided de-sanding tank having and vertical exterior wall, such as the one taught in U.S. patent application Ser. No. 14/090,477, that is modified to provide the tank with an interior conical bottom.

Solids that accumulate in the conical bottom of this tank can be more effectively removed on a daily basis. A solids outlet is provided at a lower tip of the conical bottom which is designed as an outlet for removal of the accumulated solids. The tank is also provided with water jet nozzles that are located in the vertical wall of the tank just above the conical bottom that are used in removing solids from the tank. These water jet nozzles are angled downwardly and tangentially toward the lower tip of the conical bottom to cause a swirling action within the conical bottom that more effectively removes the solids via the solids outlet.

The conical bottom of the tank is enclosed within an enclosing space bounded by a flat bottom of the tank and the vertical exterior wall of the tank that surround the interior conical bottom provided within the tank.

Because of the large amount of weight exerted by the water within the tank and the solids that accumulate within the conical bottom, the bottom must be well supported in order to hold this weight. Traditional methods of providing this type of support would add a good deal of weight to the tank and would make it more difficult and expensive to transport the assembled tank to the installation site and to install it.

The present invention addresses the problems associated with constructing a conical bottom by providing a honey combed structure of closed pore foam within the enclosing space surrounding the conical bottom as reinforcement for the conical bottom. The closed pore foam is honey combed with several voids or compartments that fill with water as the tank is placed in service so that part of the support for the conical bottom comes from the water that enters the compartments as the tank is placed into service. The foam structure provides sufficient support for the conical bottom of the tank to support it during transportation to the installation site and during installation, however, the foam structure does not provide sufficient support for the conical bottom to hold the added weight of water and solids in the tank when the tank is full.

These compartments receive water from within the tank via several downwardly facing bottom openings that extend through the wall of the conical bottom. The bottom openings are downwardly facing to prevent excessive solids from entering them as the tank is filled with water.

The bottom openings communicate between the interior of the conical bottom and a common void compartment located at the bottom of the enclosing space, and each of the compartments is in communication with the common void compartment. When the tank is placed in service, water will begin to fill the interior of the tank. As the tank fills with water, water passes through the bottom openings into the common void compartment and then into each of the compartments, filling all of the compartments with water. Air contained within each compartment is expelled into the tank as the compartment fills with water via a plurality of weep holes that communicate between the top of each compartment and the interior of the tank.

DETAILED DESCRIPTION OF THE PREFERRED EMBODIMENT

Figure 1:
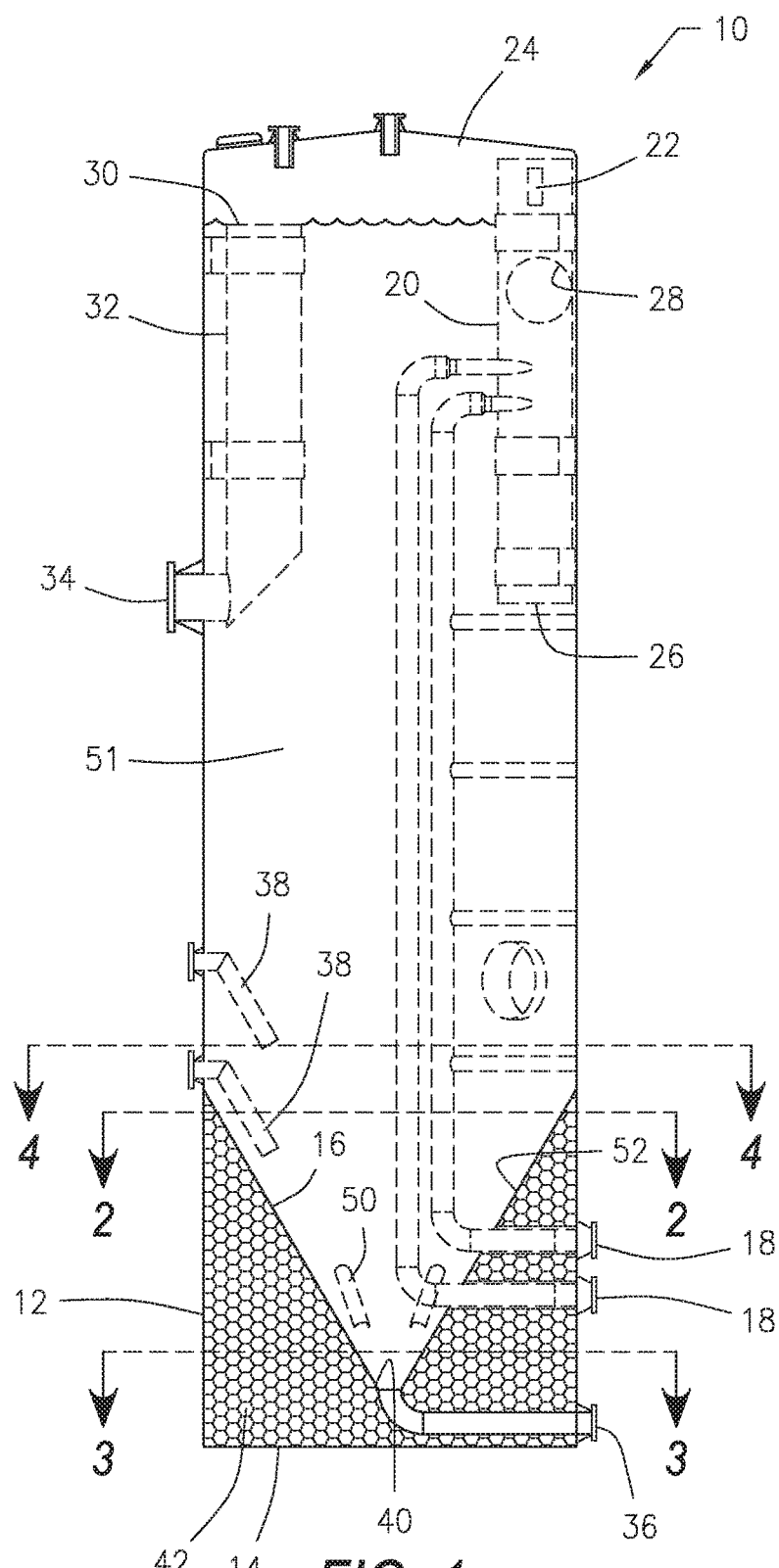
FIG. 1 is a partially cut away view of a de-sanding tank that is constructed in accordance with a preferred embodiment of the present invention.

Referring now to the drawings and initially to FIG. 1, there is illustrated a de-sanding tank 10 that is constructed in accordance with a preferred embodiment of the present invention. The de-sanding tank 10 is a straight sided de-sanding tank 10 having a strait vertical exterior wall 12 that extends down to a flat bottom 14, such as the one taught in U.S. patent application Ser. No. 14/090,477, that is modified to provide the tank 10 with an interior conical bottom 16. The teaching found in U.S. patent application Ser. No. 14/090,477 is included herein by reference.

The tank 10 is provided with one or more inlets 18 through which the water stream enters the tank 10. The inlets 18 feed into a vertical cyclone tube 20 where entrained gas separates from the liquids and passes upward through an open top 22 of the cyclone tube 20 and into the top 24 of the tank 10 from which it vents. The solids also separate from the liquids and fall out the open bottom 26 of the cyclone tube 20 and fall downward into the conical bottom 16 provided in the tank 10. The liquid flows upward out of a cyclone liquids outlet tube 28 into the tank 10 where further separation occurs. Finally, the separated liquid flows into the top 30 of one or more vertical flow dividing tubes 32 and from there out of the tank 10 via effluent piping 34.

Solids that accumulate in the conical bottom 16 of this tank 10 can be more effectively removed on a daily basis than if the tank only had a flat bottom 14. A solids outlet 36 is provided at a lower tip of the conical bottom 16 which is designed as an outlet for frequent removal of the accumulated solids. The tank 10 is also provided with water jet nozzles 38 that are preferably located in the vertical wall 12 of the tank 10 just above the conical bottom 16. The water jet nozzles 38 are used in removing solids from the tank 10.

Figure 4:
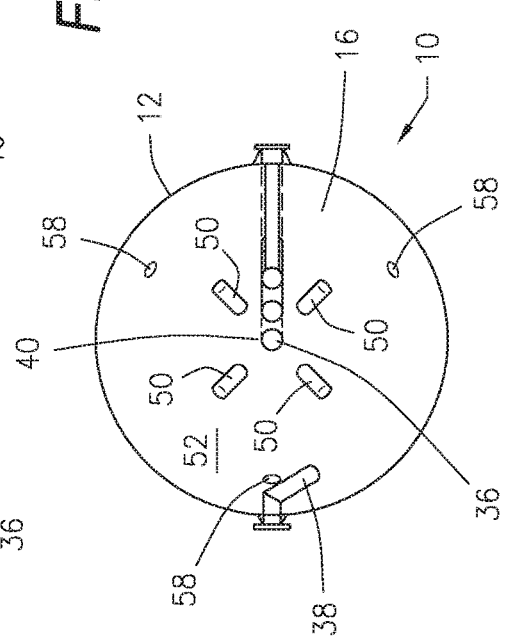
FIG. 4 is an enlarged cross sectional view taken along line 4-4 of FIG. 1.

Referring also to FIG. 4, these water jet nozzles 38 are angled downwardly and tangentially at approximately a 15 degree angle so that water flowing out of them flows toward the lower tip 40 of the conical bottom 16, causing a swirling action within the conical bottom 16 that helps in removing the solids from the tank 10 via the solids outlet 36 provided in the lower tip 40.

The conical bottom 16 of the tank 10 is enclosed within an enclosing space 42 bounded by the flat bottom 14 of the tank 10 and the vertical exterior wall 12 of the tank 10 that surround the interior conical bottom 16.

Because of the large amount of weight exerted by the water within the tank 10 and the solids that accumulate within the conical bottom 16 when the tank 10 is in service, the conical bottom 16 must be well supported in order to hold this weight. Traditional methods of providing this type of support would add a good deal of weight to the tank 10 and would make it more difficult and expensive to transport the assembled tank 10 to the installation site and to install it.

Figure 2:
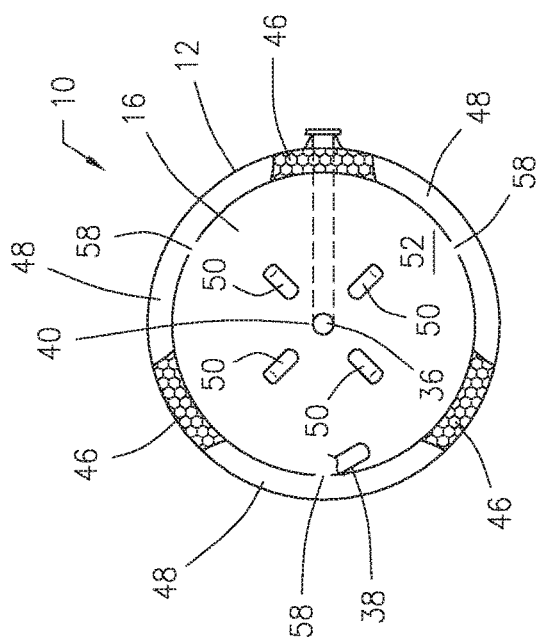
FIG. 2 is an enlarged cross sectional view taken along line 2-2 of FIG. 1.
Figure 3:
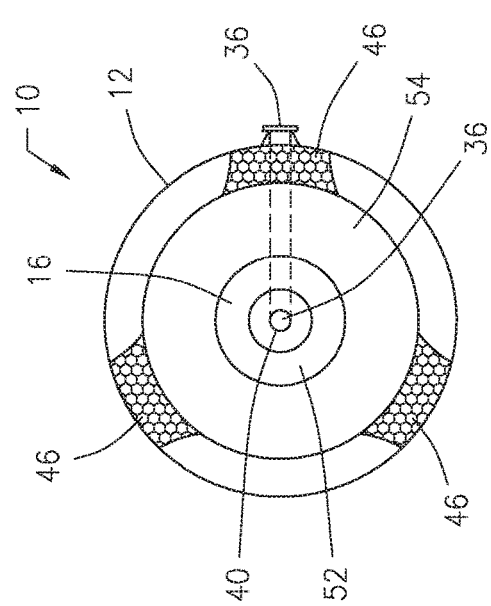
FIG. 3 is an enlarged cross sectional view taken along line 3-3 of FIG. 1.

As illustrated in FIGS. 2-5, this problem is addressed in the tank 10 by supporting the conical bottom 16 with a honey combed structure 44 preferably constructed of closed pore foam that is located within the enclosing space 42 surrounding the conical bottom 16 as reinforcement for the conical bottom 16. The closed pore foam structure 14 forms supporting columns 46, as shown in FIG. 2, within the enclosing space 42. Between the columns 46, the closed pore foam is honey combed with several voids or compartments 48 that fill with water as the tank 10 is placed in service so that part of the support for the conical bottom 16 comes from the water that enters the compartments 48 as the tank 10 is placed into service. The foam structure 44 provides sufficient support for the conical bottom 16 of the tank 10 to support it during transportation to the installation site and during installation, however, the foam structure 44 does not provide sufficient support for the conical bottom 16 to hold the added weight of water and solids in the tank 10 when the tank 10 is full.

These compartments 48 receive water from within the tank 10 via several downwardly facing bottom openings 50 that extend through the wall 52 of the conical bottom 16. The bottom openings 50 are downwardly facing to prevent excessive solids from entering them as the tank 10 is filled with water.

Figure 5:
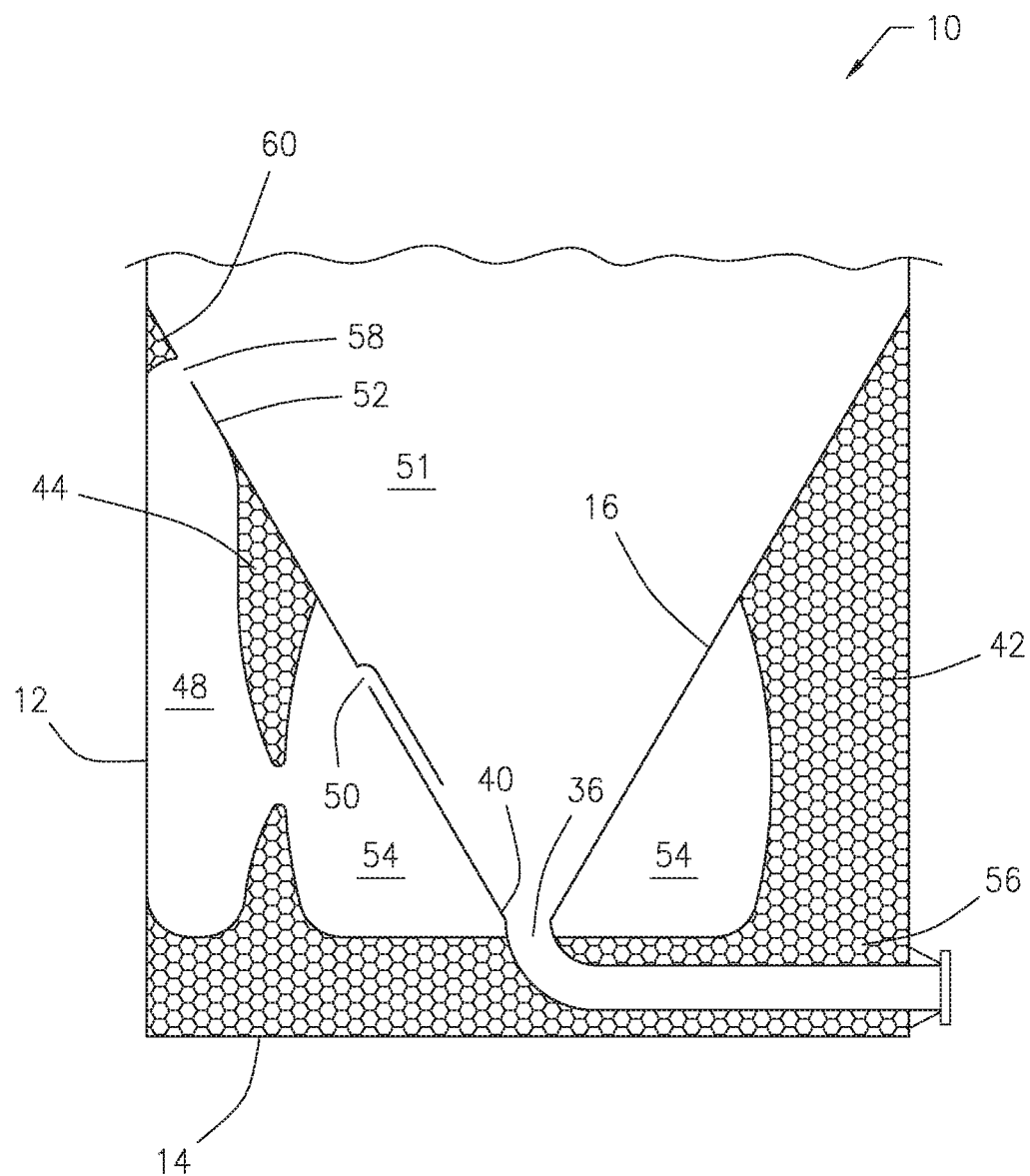
FIG. 5 is an enlarged cross-sectional diagram of the lower portion of the de-sanding tank showing the interconnection of the compartments within the honey combed structure inside the enclosing space.

As shown in FIG. 5, the bottom openings 50 communicate between the interior 51 of the conical bottom 16 of the tank 10 and a common void compartment 54 located at a lower end 56 of the enclosing space 42, and each of the compartments 48 is in communication with the common void compartment 54. When the tank 10 is placed in service, water will begin to fill the interior 51 of the tank 10. As the tank 10 fills with water, water passes through the bottom openings 50 into the common void compartment 54 and then into each of the compartments 48, filling all of the compartments 48 with water. Air contained within each compartment 48 is expelled into the tank 10 as the compartment 48 fills with water via a plurality of weep holes 58 that communicate between the top 60 of each compartment 48 and the interior 51 of the tank 10.

While the invention has been described with a certain degree of particularity, it is manifest that many changes may be made in the details of construction and the arrangement of components without departing from the spirit and scope of this disclosure. It is understood that the invention is not limited to the embodiments set forth herein for the purposes of exemplification, but is to be limited only by the scope of the attached claim or claims, including the full range of equivalency to which each element thereof is entitled.

The invention claimed is:

1. A de-sanding tank, comprising:
   an enclosed tank having a vertical wall, the vertical wall extending down to a flat bottom;
   a conical bottom disposed within an interior of the enclosed tank, the conical bottom secured to the vertical wall and forming an enclosing space bounded by an exterior of the conical bottom, the vertical wall and the flat bottom of the tank;
   a solids outlet disposed at a lower tip of the conical bottom configured for removal of solids from the enclosed tank; and
   wherein the conical bottom is at least partially supported by a support structure disposed within the enclosing space and contacting portions of the exterior of the conical bottom and the flat bottom to create voids within the enclosing space that are configured to fill with water during operation of the de-sanding tank and provide support to the conical bottom.

2. The de-sanding tank of claim 1, wherein the support structure is made from closed pore foam.

3. The de-sanding tank of claim 1, wherein the support structure creates two or more voids that extend upwardly into the enclosing space, the two or more voids being open to a common void compartment disposed towards a bottom of the conical bottom.

4. The de-sanding tank of claim 3, wherein the support structure is made from a foam material.

5. The de-sanding tank of claim 1, wherein the support structure is made from a water permeable material.

6. The de-sanding tank of claim 1, wherein the support structure is made from a foam material that fills an entire enclosing space.

7. The de-sanding tank of claim 1, wherein the support structure forms one or more supporting columns.

8. The de-sanding tank of claim 7, wherein the support structure includes three spaced supporting columns.

9. The de-sanding tank of claim 8, wherein the three spaced supporting columns are evenly spaced from each other.

\* \* \* \* \*